Aug. 4, 1953 E. M. MANNING 2,647,408
RECORD TURNTABLE DRIVE ASSEMBLY
Filed May 8, 1950
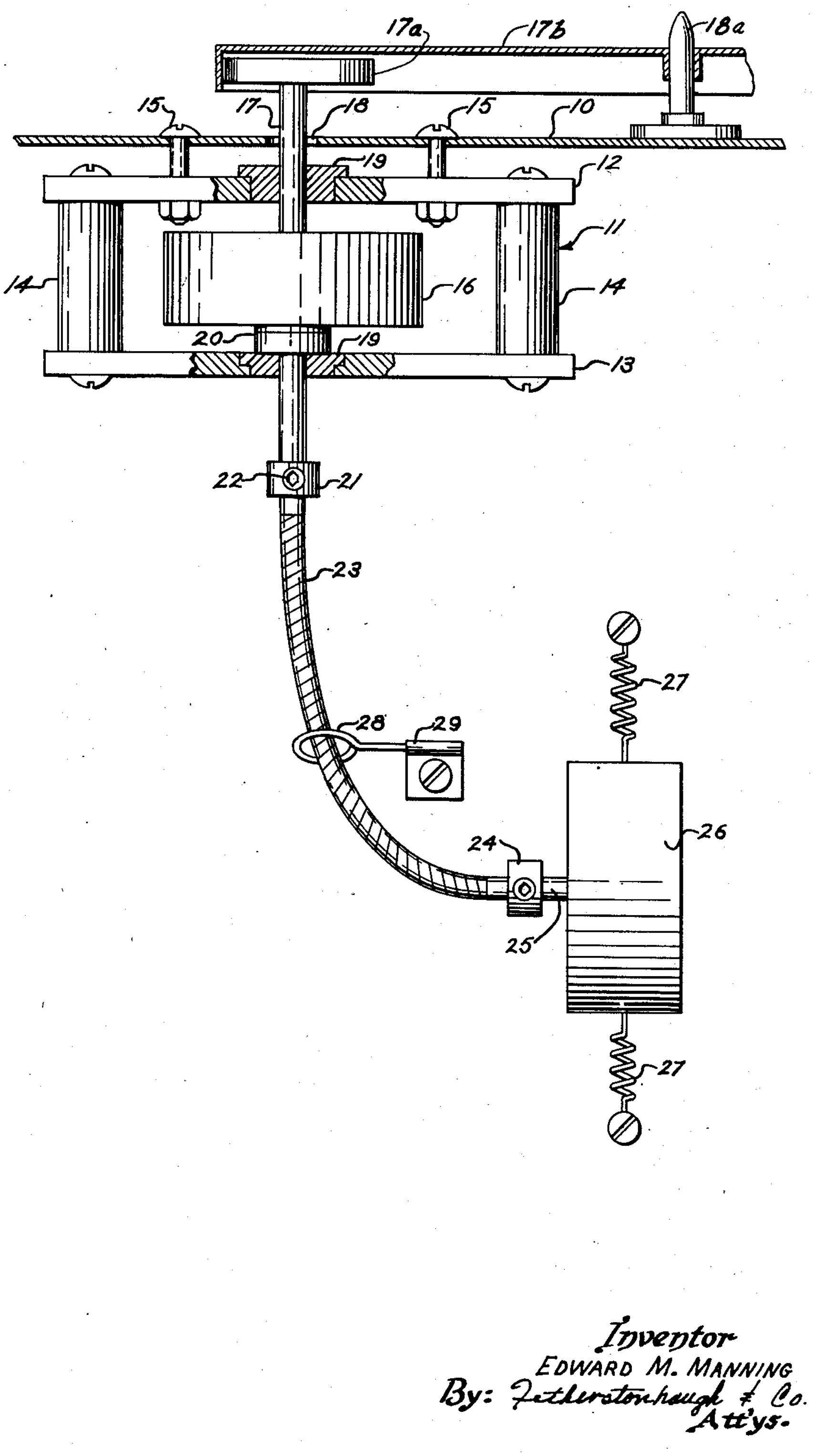
Inventor
EDWARD M. MANNING
By: Fetherstonhaugh & Co.
Att'ys.

Patented Aug. 4, 1953 2,647,408

UNITED STATES PATENT OFFICE 2,647,408

RECORD TURNTABLE DRIVE ASSEMBLY

Edward Macleod Manning, Toronto, Ontario, Canada, assignor to Manning Radio Limited, Toronto, Ontario, Canada Application May 8, 1950, Serial No. 160,613

3 Claims. (Cl. 74—206)

This invention relates to a record turntable drive assembly.

In the past various expedients have been resorted to in the elimination of vibration and hum in a record turntable construction and drive therefor. Where motor drive has been employed much difficulty has been encountered by reason of the transmission of hum field effects from the armature and field of the electrical motor to the recording pickup and from mechanical vibration expending through the drive connection to the turntable. Conventional constructions require the turntable to be weighted to provide a flywheel effect in the turntable itself to smooth out irregularities in the drive therefor. Such turntables usually operate at 78 R. P. M. or less and, therefore, move relatively slowly requiring an exceptionally heavy weight to be incorporated in the turntable to give the necessary flywheel effect. Accordingly, a desirable flywheel type of turntable is not practical by virtue of the weight of its construction for commercial phonographs for home use.

It is the main object of this invention to provide a separate flywheel operating at a relatively high R. P. M. which connects by a speed reduction device to the turntable to drive the latter.

Another object of the invention is to provide a flywheel of this character which is light in weight but which has a flywheel effect comparable to the flywheel effect of a weighted turntable running at a slower R. P. M.

A further object of the invention is to provide a record turntable drive assembly wherein the drive motor is positioned out of alignment with the axis of the turntable and operatively connects to the latter through a flexible shaft in which vibrations from the motor are lost.

Other objects of the invention will be appreciated by reference to the following specification taken in conjunction with the accompanying drawing.

In the drawing, a record turntable drive assembly according to the invention is shown wherein only those components incident to the present invention are illustrated.

Referring to the drawing, a supporting shelf 10 carries a flywheel unit 11, the latter comprising upper and lower plates 12 and 13 assembled on suitable spacers 14. Bolts 15 may serve to suspend the flywheel unit 11 from the shelf 10. A flywheel 16 of a suitable heavy material is mounted on the shaft 17, the latter extending upwardly through the opening 18 in the shelf 10 to connect to a conventional drive speed reduction device 17*a* effecting drive of a record turntable 17*b* mounted on a conventional spindle 18*a*. The shaft 17 passes through bronze or like bearings 19 in plates 12 and 13. The flywheel 16 rests on suitable washers 20 sitting on the bearing 19. The lower end of shaft 17 has a collar 21 fixed thereon by a suitable screw 22, which collar connects to a flexible shaft 23 extending downwardly to the collar 24 connecting the flexible shaft to the shaft 25 of a suitable electric motor 26. Suitable springs 27 or other equivalent means support the motor 26 and serve as sound and vibration dampening components.

In operation, the motor 26 causes rotation of shaft 17 through the flexible shaft 23. A higher motor speed allows a lesser mass to be incorporated in the flywheel 16 to obtain the necessary flywheel effect.

There will be a tendency for the flexible shaft 23 to vibrate slightly and, therefore, I prefer to employ a suitable wire loop 28, or string or any other suitable means, extending from an anchorage 29 for dampening vibrations in the flexible shaft.

It should be observed that the motor 26 is desirably mounted a sufficient distance from the turntable and the recording or playback pickup thereon whereby any field effects from the motor will have a negligible affect on the pickup.

I have found that in using a system of the character described herein, a relatively cheap electric motor may be employed for the drive and due to the sound and vibration dampening components such as the flexible shaft 23 and the springs 27 for mounting the motor, negligible vibration and sound is transmitted from the motor to the turntable. Moreover, it has been determined that the operation of a flywheel such as the flywheel 16 at a high R. P. M. is particularly desirable for driving low R. P. M. turntables, such as at 45 or 33⅓ R. P. M.

There will be many obvious alternatives apparent to skilled persons in the specific form of the components and even in their arrangement according to the principles I have set forth. It is, therefore, intended that the present disclosure should not be construed in any limiting sense other than that indicated by the scope of the following claims.

What I claim as my invention is:

1. In combination, a record disc supporting turntable, a drive motor having a rotatable shaft, a flywheel supported in a position materially spaced from said motor, a flexible shaft operatively connecting said motor and said flywheel to cause the latter to be driven at the speed of rotation of said motor and greatly exceeding the desired speed of rotation of said turntable, and a speed reduction device operatively extending between said flywheel and said turntable to cause the latter under influence of said flywheel to be driven at a regulated slower speed of rotation.

2. In combination, a record disc supporting turntable, a drive motor having a rotatable shaft, a flywheel supported in a position materially spaced from said motor, a flexible shaft operatively connecting said motor and said flywheel to cause the latter to be driven at the speed of rotation of said motor and greatly exceeding the desired speed of rotation of said turntable, a speed reduction device operatively extending between said flywheel and said turntable to cause the latter under influence of said flywheel to be driven at a regulated slower speed of rotation, sound vibration dampening means supporting said motor in a position out of axial alignment with the rotational axis of said flywheel.

3. In combination, a record disc supporting turntable, a drive motor having a rotatable shaft, a flywheel supported in a position materially spaced from said motor, a flexible shaft operatively connecting said motor and said flywheel to cause the latter to be driven at the speed of rotation of said motor and greatly exceeding the desired speed of rotation of said turntable, a speed reduction device operatively extending between said flywheel and said turntable to cause the latter under influence of said flywheel to be driven at a regulated slower speed of rotation, and means for dampening vibrations in said flexible shaft comprising a loop of material extending thereabout for limiting the amplitude of vibrations at a selected point thereon.

EDWARD MACLEOD MANNING.

References Cited in the file of this patent

UNITED STATES PATENTS

| Number | Name | Date |
|---|---|---|
| 322,666 | Wilson | July 21, 1885 |
| 1,582,664 | Bennington | Apr. 27, 1926 |
| 2,091,536 | Van Impe | Aug. 31, 1937 |
| 2,144,064 | Johnson | Jan. 17, 1939 |
| 2,356,818 | Buckman | Aug. 29, 1944 |
| 2,438,265 | Metzer | Mar. 23, 1948 |
| 2,522,960 | Price | Sept. 19, 1950 |

FOREIGN PATENTS

| Number | Country | Date |
|---|---|---|
| 509,447 | France | Aug. 18, 1920 |